(12) United States Patent
Carroll

(10) Patent No.: US 6,183,861 B1
(45) Date of Patent: Feb. 6, 2001

(54) CONFORMABLE COMPOSITE CHEMICAL BARRIER CLOSURE AND ATTACHMENT TAPE

(76) Inventor: Todd R. Carroll, 5613 Springcreek Dr., Gunterville, AL (US) 35976

(*) Notice: Under 35 U.S.C. 154(b), the term of this patent shall be extended for 0 days.

(21) Appl. No.: 09/014,505

(22) Filed: Jan. 28, 1998

Related U.S. Application Data

(60) Provisional application No. 60/035,435, filed on Jan. 30, 1997.

(51) Int. Cl.[7] ........................................ B32B 7/12
(52) U.S. Cl. .................... 428/354; 428/343; 428/352; 428/356; 442/151
(58) Field of Search .................. 428/354, 343, 428/352, 356

(56) References Cited

U.S. PATENT DOCUMENTS

| | | | |
|---|---|---|---|
| 3,394,799 | * 7/1968 | Ritson | 428/354 |
| 3,716,437 | * 2/1973 | Newmen | 428/354 |
| 4,303,724 | * 12/1981 | Sergent | 428/354 |
| 4,705,715 | * 11/1987 | Decoste | 428/354 |
| 4,740,416 | * 4/1988 | Decoste | 428/354 |
| 4,992,331 | * 2/1991 | Decoste | 428/354 |
| 5,108,815 | * 4/1992 | Adams | 428/354 |
| 5,162,150 | * 11/1992 | Buis | 428/354 |

\* cited by examiner

Primary Examiner—Terrel Morris
Assistant Examiner—Christopher C. Pratt
(74) Attorney, Agent, or Firm—Henry Croskell

(57) ABSTRACT

A conformable, hand-tearable, high chemical barrier closure and attachment tape made up of a film composite which contains at least one stratum layer of polyvinylidene chloride, ethylene vinyl acetate, ethylene vinyl alcohol ethylene matallized polyester or similar chemical resistance material which may be disposed between additional layers of polyethylene, the film composite coated with an appropriate pressure sensitive adhesive which is further adhered to a woven base cloth which is further coated with additional pressure sensitive adhesive. Tapes having the structure show improved chemical resistance to the 15 liquid chemicals included on the ASTM F1001 chemical test battery as compared to a competitive tapes commonly used in the protective clothing and chemical packaging industry.

13 Claims, 2 Drawing Sheets

CONFORMABLE COMPOSITE CHEMICAL BARRIER CLOSURE AND ATTACHMENT TAPE

This application is a continuation-in-part application of Provisional Application Ser. No. 60/035,435 filed Jan. 30, 1997.

FIELD OF THE INVENTION

This invention relates generally to protective garments, equipment, and containers (i.e, boxes, bottles, and bags) and more particularly to a conformable, composite chemical barrier tape that can be used to create highly chemically resistant closures and attachments. These closures and attachments include unions made between separate items of protective equipment including garment sleeves and gloves, garment legs and boots, around hoods, over zippers, and the like. This chemically resistant tape is secured to an item by way of a pressure sensitive adhesive and its conformability will allow for the attachment of dissimilar materials and complex shapes often times found on personnel protective equipment.

BACKGROUND OF THE INVENTION

It has been common practice to use "duct-tape" for protective garments, equipment and container applications. Duct-tape was originally developed for the heating, ventilation, and air conditioning (HVAC) business as a sealing device that would minimize or eliminate air leakage from air handling systems (i.e., duct work). "Duct-tape" has found widespread application within numerous other industries unrelated to the HVAC business. "Duct-tape" can generally be characterized as a three component product consisting of a thin polyethylene film laminated to a woven cloth backing that has been coated with a desired amount of pressure sensitive adhesive. It has become common practice to utilize polyethylene based "duct-tape" as a supplemental sealing device on chemical protective clothing. The overall purpose of the tape is to control, minimize, and possibly eliminate the influx of hazardous chemicals, including solids, liquids, gases, and chemical warfare agents into the protective ensemble that would otherwise expose the wearer. Other unsupported polyethylene, and polyvinyl chloride based tapes are used in the packaging of chemicals to seal around caps on bottles, and to secure boxes. Tapes are used in these applications to prevent or minimize leakage of chemical from the container. Unfortunately, common duct-tape and unsupported polyethylene, and polyvinyl chloride based tapes only offer the user a very limited amount of chemical resistance.

SUMMARY OF THE INVENTION

The object of this invention is to provide a conformable, hand-tearable, high chemical barrier closure and attachment tape made up of a film composite or multi-layered film containing at least one stratum selected from polyvinylidene chloride, ethylene vinyl acetate, ethylene vinyl alcohol, nylon, polyvinyl alcohol, polyester, polytetraflouroethylene, fluorinated ethylene propylene, polyvinyldene chloride copolymer, acrylonitrile, Surlyn, high density polypropylene, linear-low density polypropylene, metalized polyester and the like. The film composite providing the chemical barrier is coated with an appropriate pressure sensitive adhesive which is further adhered to a woven base cloth, the cloth is further coated with additional pressure sensitive adhesive. In addition, a conformable composite chemical barrier closure and attachment tape is presented which is comprised of a film composition containing a layer of at least one of polyester with a layer of polyethylene or ethylene vinyl alcohol which can be disposed between additional layers of polyethylene. The conformable, composite chemical barrier closure and attachment tape also provides the multi-layered film with coating on the exterior of the film to promote release, unwinding characteristics from a roll so that the conformable, composite chemical barrier and attachment tape can be manufactured and stored in rolled form and yet provide immediate release upon demand from the roll. The multi-layered film can have an exposed surface of polyethylene, the film having a thickness in the range from about 0.5 mils to about 6.0 mils. The multi-layered film can have a laquer or similar coating on the exterior of the film to promote release from unwinding from a roll. The tape in accordance with the invention has a base cloth which is woven, the woven base cloth being comprised of natural or synthetic fibers including cotton, rayon, polyester, polyamide, acrylic and blends thereof. The tape has a pressure sensitive adhesive selected from natural rubber, butyl rubber, silicone, acrylic, styrene-butidiene rubber, ethylene- propylene-diene [tur] polymers and the like. The chemical resistant multiple layer film is laminated to a woven or non-woven base cloth wherein the multi-layered film is further coated with a pressure sensitive adhesive. Tapes in accordance with the invention provide a structure yielding improve chemical resistance, for example, to the 15 chemicals included on the ASTM F1001 chemical test battery as compared to competitive polyethylene duct tape and the like commonly used in the protective clothing and chemical packaging industry.

The conformable composite chemical barrier closure-attachment tapes in accordance with the present invention provide improved and novel products for protective clothing, packaging and the like to prevent or minimize chemical penetration to the protective suit wearer or prevent or minimize leakage of chemicals from containers.

DETAILED DESCRIPTION OF THE INVENTION

Figure 1:
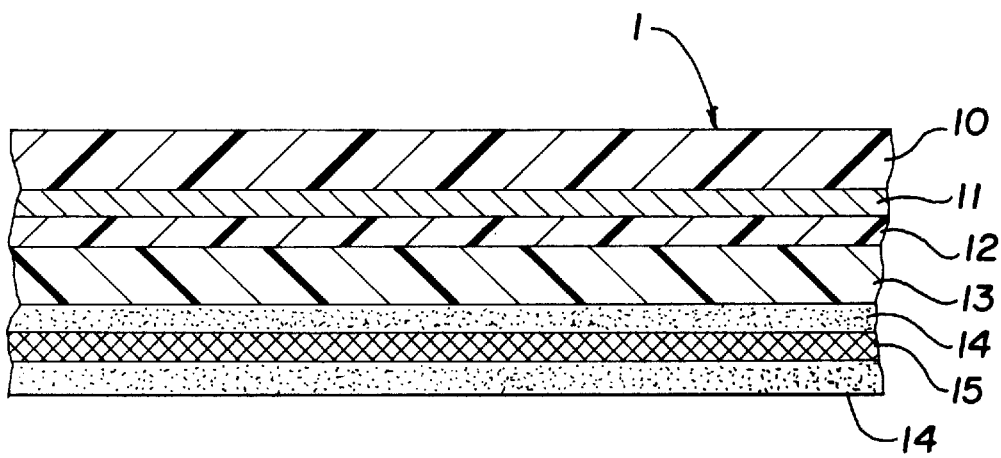
FIG. 1 is an enlarged cross-sectional view of a composite chemical tape according to the invention including the multi- layered chemical film adhered to the woven base cloth that has been coated on both faces with a pressure sensitive adhesive.

Referring to FIG. 1, a conformable, hand-tearable, high chemical barrier closure and attachment tape 1 is shown. The tape 1 consists of a base woven cloth (i.e., 0.75 ozsqy, 20×10 thread count, woven polyester/cotton) 15 that has been coated on the interior surface with a suitable amount of polyisoprene pressure sensitive adhesive 14, and on the exposed surface with a suitable amount of polyisoprene pressure sensitive adhesive 14. The interior polyisoprene surface 14, is further laminated to the corona-treated (>38 dynes) side of a clear, 48 gauge polyester film (Rhom Polanc) 13, which has been primed with a mica primer (Mica, product ID A131X) and extrusion laminated to the linear low density polyethylene (LLDPE) side of a clear, blown, 1.25 mil coextruded film of LLDPE and low density polyethylene (LDPE) (Cadillac Products) 10, with 15 #/rem of LDPE extrudate (Dow Ref #722) 12, Prior to extrusion lamination, the LLDPE side of the coex 10, has been corona treated to a level of 44–48 dynes and reverse printed with a black aqueous based ink (Crown Zellerbach Standard black), 45 degrees off-set, random repeat logo pattern 11, using the Flexo-Graphic process. Additional color has been added to the tape 1, by adding approximately 2–4% percent yellow color concentrate (Ampiset Color #13839) to the extrudate 12. The tape 1, is slit to 2-in widths using pinking blades or straight edges to promote the transverse fingertearability of the final product which is delivered in roll form. Other pressure sensitive adhesives such as ethylene-propylene-diene (EPDM) terpolymers, butyl rubber, styrene- butadiene rubber (SBR), silicone, acrylic, and blends thereof, can be substituted for the polyisoprene adhesive 14.

Selection of the proper characteristics of the exposed surface of layer 10, and the bottom surface of the polyester layer 13 is used to ensure that the tape can be cleanly and easily unwound from the roll. The exposed surface of the coex layer 10 is a LDPE film of density between 910–925 gms/cc with a surface energy less than 35 dynes. Other techniques including application of over-lacquers and release coatings to the outer most surface of the tape 10 can promote and improve unwind characteristics from the roll, and can open-up the composite to other exterior films which could include polyvinylidene chloride, ethylene vinyl acetate, ethylene vinyl alcohol, nylon, polyvinyl alcohol, polyester, polyteraflouroethylene, fluorinated ethylenepropylene, polypropylene, polyvinylidene chloride copolymer, acrylonitrile, Surlyn, high density polyethylene, linear-low density polyethylene, metallized polyester, and composites thereof. The inner most surface (i.e, surface exposed to the pressure sensitive adhesive) of the film contained within the tape, (i.e., polyester in this embodiment), must have a surface energy higher than that of the outer most layer 10 to ensure that the tape composite remains intact during unwind (i.e., the adhesive remains on the polyester 13 and releases from the LDPE surface of layer 10). A surface energy of at least 38 dynes is required on the surface laminated to the pressure sensitive adhesive 14.

Figure 2:
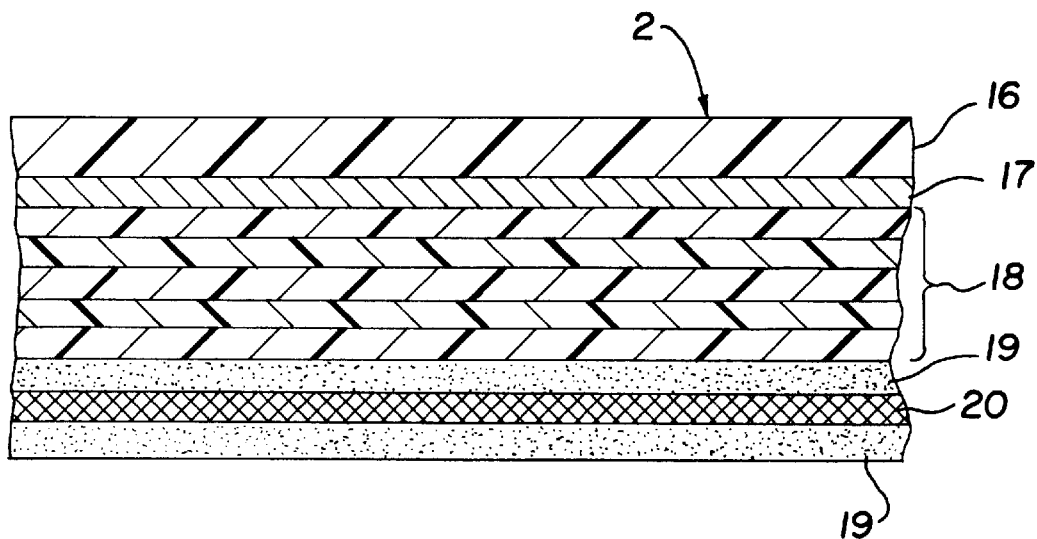
FIG. 2 is a cross-section view of a similar yet different embodiment of the invention.

It is obvious from the discussion presented above that other films and film composites of proper surface characteristics can be used to demonstrate the subject tape. An alternative embodiment as shown in FIG. 2 includes a similar base cloth 20 and polyisoprene pressure sensitive adhesive 19 as described above laminated to a different chemical barrier film composite. The interior polyisoprene pressure sensitive adhesive is laminated to the corona-treated (i.e. >38 dynes) LDPE surface of a 2.25 mil five-layer cast coextruded film 18 (Cadillac Plastics CP225). The cast coex layer 18 contains an exterior layer of LLDPE, an interior layer of ethylene vinyl alcohol, and an exterior layer of LDPE. Sufficient tie-layers of LDPE and EMA are positioned between these layers to form the composite 18. The LLDPE layer is colored yellow and LDPE layer is colored white by the addition of approximately 2–4% of color concentrate in the films. The outer surface of LLDPE is corona-treated inline to a level of 44–48 dynes and surface printed with a black aqueous based ink (Crown Zellerbach Standard black), 45 degrees off-set, random repeat logo pattern 17, using the Flexo-Graphic process. The surface of the tape 2, is finished with a 20 #/rem extrusion coating of clear LDPE 16 of density 918–925 gms/cc. The tape 2, is slit to 2-in widths using pinking blades to promote the transverse finger-tearability of the final product which is delivered in roll form. Other pressure sensitive adhesives such as ethylene-propylenediene (EPDM) terpolymers, butyl rubber, styrene-butadiene rubber (SBR), silicone, acrylic, and blends thereof, can be substituted for the polyisoprene adhesive 19.

Table 1 includes a summary of hypothetical chemical resistance of two common commercially available "duct-tapes" similar to those used on protective garments. ASTM F739 is the industry standard for measuring chemical resistance and was used to support this application. The list of chemicals in Table 1 has been taken from the American Society for Testing and Materials (ASTM), Standard Battery of Chemicals (i.e., ASTM F1001 liquids only). This matrix of chemicals represents the major classes of chemicals and has become a common tool for manufacturers and users when comparing the performance of protective fabrics. Table 1 also includes the chemical resistance of several chemical protective fabrics that are in use within the hazardous materials industry. A value called "permeation efficiency" is included at the bottom of the table and can be used to easily compare the relative chemical resistances of the materials. Permeation efficiency is calculated by adding the breakthrough times for the chemicals tested and dividing by the total number of chemicals tested multiplied times 480 minutes (i.e. 8 hours) see Equation 1. Eight hours represents the duration of the permeation test and has become defacto the target level of performance (i.e., breakthrough time) desired by end-users when considering chemical resistance data. Breakthrough time is in effect the length of time that a barrier would protect a user from contact with the challenge chemical. It becomes obvious in Table 1 that the level of chemical resistance offered by common "duct-tape" is far below that of the garments currently worn by today's users. Protective Fabric "B" in Table 1 is one of the chemical protective fabrics on the market and exhibits a permeation efficiency of approximately 33%. With a hypothetical permeation efficiency of less than 15%, commercial "duct-tape" provides less than 50% of the resistance of this commercially available protective fabric. It becomes apparent that improvement is necessary in the chemical resistance of tapes used as supplemental closures and attachments.

$$\text{Permeation Efficiency} = \frac{\text{(sum of breakthrough times)}}{\text{(\# of chemicals tested)} \times (480)}$$

TABLE 1

CHEMICAL RESISTANCE OF "DUCT-TAPES" AND CHEMICAL PROTECTIVE FABRICS

| | Breakthrough Time (minutes) [ASTM F739] | | | | | | |
|---|---|---|---|---|---|---|---|
| | Commercial "Duct-Tapes" | | Commercial Limited-Use Chemical Protective Fabrics | | | | |
| Chemical | A* | B* | A | B | C | D | E |
| acetone | <10 | <10 | <4 | >480 | >480 | >480 | >480 |
| acetonitrile | <10 | <10 | <4 | 42 | 7 | >480 | >480 |
| carbon disulfide | <10 | <10 | <4 | <4 | 16 | >480 | >480 |
| dichloromethane | <10 | <10 | <4 | <4 | 6 | 114 | 114 |
| diethylamine | <10 | <10 | <4 | 14 | >480 | >480 | >480 |
| dimethylformamide | <30 | <30 | 25 | 95 | >480 | >480 | >480 |

TABLE 1-continued

CHEMICAL RESISTANCE OF "DUCT-TAPES" AND CHEMICAL PROTECTIVE FABRICS

| | Breakthrough Time (minutes) [ASTM F739] | | | | | | |
|---|---|---|---|---|---|---|---|
| | Commercial "Duct-Tapes" | | Commercial Limited-Use Chemical Protective Fabrics | | | | |
| Chemical | A* | B* | A | B | C | D | E |
| ethyl acetate | <10 | <10 | <4 | 28 | >480 | >480 | >480 |
| hexane | <10 | <10 | <4 | 10 | >480 | >480 | >480 |
| methanol | <10 | <10 | 5 | >480 | 8 | >480 | >480 |
| nitrobenzene | <10 | <10 | 5 | 205 | >480 | >480 | >480 |
| sodium hydroxide | >480 | >480 | >480 | >480 | >480 | >480 | >480 |
| sulfuric acid | >480 | >480 | >480 | >480 | >480 | >480 | >480 |
| tetrachloroethylene | <10 | <10 | <4 | 10 | >480 | >480 | >480 |
| tetrahydrofuran | <10 | <10 | <4 | <4 | >480 | >480 | >480 |
| toluene | <10 | <10 | 8 | 4 | >480 | >480 | >480 |
| permeation efficieny | <15% | <15% | 14% | 33% | 74% | 95% | 100% |

*Hypothetical Breakthrough Time

A preferred embodiment of this invention offers a novel tape designed for the intended purpose of providing a high chemical barrier on chemical protective garments. Table 2 includes the hypothetical chemical resistance of two such embodiments. Proper selection of the surface and core layers of the chemical resistance is very important in order to achieve chemical barrier. Proper selection of the surface and core layers of the chemical barrier film, as well as the surface characteristics of the film, are critical to achieving the desired level of chemical resistance, release properties from the roll, and adherence characteristics to the pressure sensitive adhesive. Additionally, selection of the proper chemical film and base cloth, as well as the trim finish on the final product, are critical to ensuring that the tape is easily "finger-tearable."

TABLE 2

CHEMICAL RESISTANCE OF CHEMICALLY RESISTANT TAPES

| | Breakthrough Time (minutes) [ASTM F739] Chemically Resistant Tapes* | |
|---|---|---|
| Chemical | Embodiment #1 | Embodiment #2 |
| acetone | >480 | >480 |
| acetonitrile | >150 | >480 |
| carbon disulfide | >480 | <15 |
| dichloromethane | <15 | <15 |
| diethylamine | >480 | 105 |
| dimethylformamide | >480 | >480 |
| ethyl acetate | >480 | 50 |
| hexane | >480 | >480 |
| methanol | 75 | 135 |
| nitrobenzene | >480 | >480 |
| sodium hydroxide | >480 | >480 |
| sulfuric acid | >480 | >480 |
| tetrachloroethylene | >480 | 30 |
| tetrahydrofuran | >450 | <15 |
| toluene | >480 | >135 |
| permeation efficiency | 83% | 54% |

*Hypothetical Breakthrough Times (minutes)

Further research and development was completed on the chemical barrier in accordance with the invention. Several successful runs of the product were made and third party chemical resistance testing were conducted as detailed. As suspected, better than anticipated permeating results were realized on the final product verses equivalent composite films in non-tape form. Table 3 includes permeation results for a high quality duct tape, the anticipated results for the embodiments included in the provisional application, and the actual results for the current version of the product. The actual product, is most similar to Embodiment #2 and presented in FIGS. 3 and 4. It is clear from the data that the chemical resistance of a film is enhanced when the film is combined with a cloth and an adhesive and tested as a tape. The anticipated permeation efficiency of embodiment #2 is only 54% while the actual permeation efficiency of Chem-Tape® 2 is 96%. This is an outstanding improvement over standard HVAC type duct tape (ie., 38%) and the permeation efficiency anticipated for the product.

Figure 3:
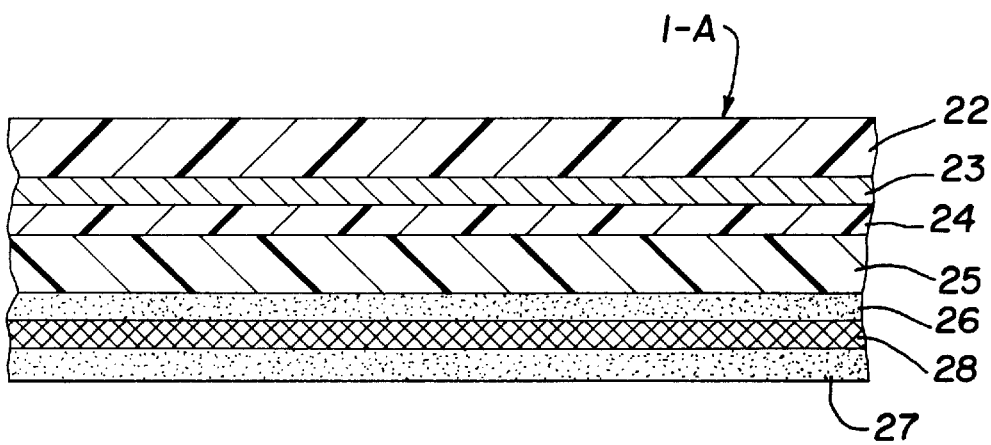
FIG. 3 is an enlarged cross-sectional view of yet another embodiment of a hand-tearable composite chemical tape of the invention.
Figure 4:
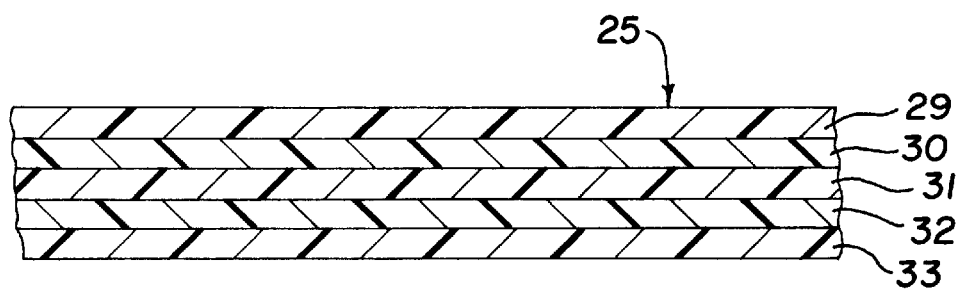
FIG. 4 is an enlarged cross-sectional view of the coex layer 25 of FIG. 3.

The actual embodiment demonstrated by the provisional patent and tested as Chem-Tape® 2 is described in FIGS. 3 and 4. Referring to FIG. 3, a conformable, hand-tearable, high chemical barrier closure and attachment tape 1-A is shown. The tape consists of a base woven cloth (i.e., 30×14 thread count, woven polyester/cotton) 28 that has been coated on the interior surface with suitable amount of polyisoprene pressure sensitive adhesive 26, also known as the laminating adhesive, and on the exposed

TABLE 3

CHEMICAL RESISTANCE OF CHEMICALLY RESISTANT TAPES

| | Breakthrough Time (minutes) [ASTM F739, normalized] | | | |
|---|---|---|---|---|
| Chemical | High Quality Duct Tape | Embodiment #1 (anticipated) | Embodiment #2 (anticipated) | Chem-Tape ®2 (actual) |
| acetone | 21 | >480 | >480 | >480 |
| acetonitrile | >480 | >150 | >480 | >480 |
| carbon disulfide | 1 | >480 | <15 | >480 |
| dichloromethane | 2 | <15 | <15 | >480 |
| diethylamine | 30 | >480 | 105 | 160 |
| dimethylformamide | >480 | >480 | >480 | >480 |
| ethyl acetate | 6 | >480 | 50 | >480 |
| hexane | 4 | >480 | >480 | >480 |
| methanol | 86 | 75 | 135 | >480 |
| nitrobenzene | >480 | >480 | >480 | >480 |
| sodium hydroxide | >480 | >480 | >480 | >480 |
| sulfuric acid | >480 | >480 | >480 | >480 |
| tetrachloroethylene | 2 | >480 | 30 | >480 |
| tetrahydrofuran | 2 | >480 | <15 | >480 |
| toluene | 4 | >480 | >135 | >480 |
| permeation efficiency | 38% | 83% | 54% | 96% | with a surface energy less than 35 dynes. Other techniques including application of over-lacquers and release coatings to the other most surface of the tape 1-A can promote and improve unwind characteristics from the roll, and can open-up the composite to other exterior films which could include polyvinylidene chloride, ethylene vinyl acetate, ethylene vinyl alcohol, nylon, polyvinyl alcohol, polyester, polyteraflouroethylene, fluorinated ethylenepropylene, polypropylene, polyvinylidene chloride copolymer, acrylonitrile, Surlyn, high density polyethylene, linear-low density polyethylene, metallized polyester, and composites thereof. The surface energy of the inner most surface (i.e., surface exposed to the pressure sensitive adhesive) must be higher than that of the outer most layer 22 to ensure that the tape composite remains intact during unwind (i.e., the adhesive remains on the coex film, 25, and releases from the LDPE surface of layer 22). A surface energy of at least 38 dynes is required on the surface laminated to the pressure sensitive adhesive, 26.

One composite chemical barrier closure-attachment tape in accordance with the invention, is comprised of a film composition, a multiple layer film adhesively laminated to a base cloth which is further coated with a suitable pressure sensitive adhesive. The invention is defined wherein the multi-layered film contains at least one stratum selected from the group consisting of polyvinylidene chloride, ethylene vinyl acetate, ethylene vinyl alcohol, nylon, polyvinyl alcohol, polyester, surface with a suitable amount of polyisoprene pressure sensitive adhesive 27, also known as the working adhesive. The interior polyisoprene surface 26, is further laminated to a 1.75 mil five-layer coextruded film 25 (Cadillac Plastic CP245). The coex layer, 25, see FIG. 4, contains an exterior layer of low density polyethylene (LDPE), 33, an interior layer of ethylene vinyl alcohol (EvOH) 31, and an exterior layer of LLDPE 29. The LDPE surface, 33, has been corona-treated to >38 dynes. Sufficient tie-layers, 30 and 32, of LDPE and EMA are positioned between these layers to form the composite 25. The coex chemical barrier layer 25 is extrusion laminated to the LLDPE side of a clear 1.25 mil coextruded film of LLDPE and LDPE, (Cadillac Products) 22, with 15 #/rem of LDPE extrudate (Dow Ref #722) 24 of FIG. 3. Prior to extrusion lamination, the LLDPE side of the coex, 22, has been corona treated to a level of 44–48 dynes and reverse printed with a black aqueous based ink (Crown Zellerbach Standard black), 45 degrees off-set, random repeat logo pattern, 23, using the Flexo-Graphic process. Additional color has been added to the tape, 1, by adding approximately 2–4% percent yellow color concentrate (Ampiset Color #13839) to the extrudate, 24.

Referring to FIG. 3, selection of the proper characteristics of the exposed surface of layer 22, and the bottom surface of the five layer coex, 25, are critical to ensuring that the tape can be cleanly and easily unwound from the roll. The exposed surface of the coex layer 22 is a LDPE film of density between 910–925 gms/cc polytetraflouroethylene, fluorinated ethylenepropylene, polypropylene, polyvinylidene chloride copolymer, acrylonitrile, Surlyn, high density polyethylene, linear-low density polyethylene, and metallized polyester. The conformable, composite chemical barrier closure and attachment tape also provides the multi-layered film with coating on the exterior of the film to promote release unwinding characteristics from the roll so that the conformable, composite chemical barrier and attachment tape can be manufactured and stored in rolled form yet provide immediate release upon demand from the roll. The invention also includes various other elements, for example:

a multi-layered film having an exposed surface of polyethylene;

the polyethylene is low density polyethylene;

the multi-layered film has a thickness in the range of from 0.5 mils to about 6.0 mils;

the multi-layered film has a lacquer coating on the exterior of the film to promote release for unwind from the roll;

the tape has a base cloth which is woven;

the woven base cloth is comprised of natural or synthetic fibers including, cotton, rayon, polyester, polyamide, acrylic or blends thereof;

the tape has a pressure sensitive adhesive selected from natural rubber, butyl rubber, silicone, acrylic, styrene-butadiene rubber, ethylene-propylene-diene terpolymers and the like;

a chemically resistant multi-layered film laminated to a woven or non-woven base cloth, wherein the multi-layered film is further coated with a pressure sensitive adhesive; and the pressure sensitive adhesives can be selected from natural rubber, butyl rubber, silicone, acrylic, styrene-butadiene rubber, ethylene-propylene-diene terpolymers and the like.

The terms and expressions which have been employed are used as terms of description and not of limitation, and it is not intended in the use of such terms and expressions to exclude an equivalence of the features shown and described or portions thereof, since it is recognized that various modifications are possible within the scope of the invention claimed.

What is claimed is:

1. The conformable composite chemical barrier closure-attachment tape comprising;

a chemical barrier, multiple layer film composition contains at least one layer of polyester or ethylene vinyl alcohol disposed between layers of polyethylene, the film composite coated with pressure sensitive adhesive;

a base cloth laminated to the chemical barrier film composition on a first surface through a film composition pressure sensitive adhesive coating and the base cloth having a second surface coated with a pressure sensitive adhesive.

2. The conformable composite chemical barrier closure-attachment tape according to claim 1 wherein the polyethylene is comprised of low density polyethylene.

3. The conformable composite chemical barrier closure-attachment tape according to claim 1 wherein the multi-layered chemical barrier film composition has a thickness in the range of from about 0.5 mils to 6.0 mils.

4. The conformable composite chemical barrier closure-attachment tape according to claim 1 wherein the chemical barrier, multiple layer film composition has a lacquer coating on an exterior of the film to promote release for unwinding from a roll of the tape.

5. The conformable composite chemical barrier closure-attachment tape according to claim 1 wherein the base cloth is woven.

6. The conformable composite chemical barrier closure-attachment tape according to claim 5 wherein the woven base cloth is selected from the group consisting of natural and synthetic fibers cotton, rayon, polyester, polyamide, and acrylic.

7. The conformable composite chemical barrier closure-attachment tape according to claim 1 wherein the tape has a pressure sensitive adhesive selected from the group consisting of natural rubber, butyl rubber, silicone, acrylic, styrene-butadiene rubber, and ethylene-propylene-diene terpolymers.

8. The conformable composite chemical barrier closure-attachment tape according to claim 1 wherein the multi-layered film has a coating on the exterior of the film to promote release unwinding characteristics from a roll so that the conformable composition chemical barrier and attachment tape can be manufactured and stored in rolled form while providing immediate release upon demand from the roll.

9. The conformable composite chemical barrier closure-attachment tape according to claim 8 wherein the exterior surface of the film in order to promote release has a surface energy of less than about 35 dynes.

10. The conformable composite chemical barrier closure-attachment tape according to claim 1 wherein a interior surface of the multiple layer film composite in contact with the adhesive laminating the film to the base cloth has a surface energy of at lease 38 dynes.

11. The conformable composite chemical barrier closure-attachment tape according to claim 1 wherein the interior surface of the film is corona-treated to a level of about 44 to about 48 dynes.

12. The conformable composite chemical barrier closure-attachment tape according to claim 11 wherein polyisoprene pressure sensitive adhesive is laminated to the chemical barrier multiple layered film having a surface comprised of low density polyethylene which has been corona-treated to at least about 38 dynes.

13. The conformable composite chemical barrier closure-attachment tape according to claim 1 wherein the chemical resistance of the tape is enhanced through the combination of the multiple layer film adhesive laminant, cloth and adhesive surface with a permeation efficiency of at least about 25 percent above the permeation efficiency of duct tape and the chemical barrier multiple layer film composite tested separately.

* * * * *